(12) United States Patent
Grosse-Brinkhaus et al.

(10) Patent No.: US 7,504,444 B2
(45) Date of Patent: Mar. 17, 2009

(54) AQUEOUS ELECTROCOAT MATERIALS, THEIR USE IN PROCESSES FOR COATING ELECTRICALLY CONDUCTIVE SUBSTRATES, AND THE USE OF BISMUTH COMPOUNDS IN THESE AQUEOUS ELECTROCOAT MATERIALS

(75) Inventors: Karl-Heinz Grosse-Brinkhaus, Nottuln (DE); Günther Ott, Münster (DE); Hardy Reuter, Münster (DE); Hans-Otto Köbbert, Sendenhorst (DE)

(73) Assignee: BASF Coatings AG, Munster (DE)

( * ) Notice: Subject to any disclaimer, the term of this patent is extended or adjusted under 35 U.S.C. 154(b) by 204 days.

(21) Appl. No.: 11/416,909

(22) Filed: May 3, 2006

(65) Prior Publication Data
US 2007/0027238 A1    Feb. 1, 2007

Related U.S. Application Data

(63) Continuation of application No. 10/521,343, filed on Jan. 7, 2005, now abandoned.

(51) Int. Cl.
C08K 5/02    (2006.01)
C08K 5/44    (2006.01)
C08K 5/56    (2006.01)

(52) U.S. Cl. .................. 523/122; 524/177; 524/399; 524/589

(58) Field of Classification Search ............. 524/399, 524/177, 589; 523/122
See application file for complete search history.

(56) References Cited

U.S. PATENT DOCUMENTS

| 5,972,189 | A | * | 10/1999 | McMurdie et al. | 204/501 |
| 6,124,380 | A | * | 9/2000 | Bossert et al. | 523/404 |
| 6,156,823 | A | * | 12/2000 | Sikora | 523/415 |
| 6,333,367 | B1 | * | 12/2001 | Kato et al. | 523/409 |

* cited by examiner

*Primary Examiner*—Kriellion A Sanders
(74) *Attorney, Agent, or Firm*—Cantor Colburn LLP

(57) ABSTRACT

Electrocoat material comprising bismuth compounds, comprising:
 (A) at least one self-crosslinking and/or externally crosslinking binder containing(potentially) cationic or anionic groups and reactive functional groups which (i) with themselves or with complementary reactive functional groups in the self-crosslinking binder, or (ii) in the case of the externally crosslinking binder, with complementary reactive functional groups present in crosslinking agents (B) are able to undergo thermal crosslinking reactions, (B) if desired, at least one crosslinking agent comprising the complementary reactive functional groups, and (C) at least one bismuth compound.

10 Claims, No Drawings

AQUEOUS ELECTROCOAT MATERIALS, THEIR USE IN PROCESSES FOR COATING ELECTRICALLY CONDUCTIVE SUBSTRATES, AND THE USE OF BISMUTH COMPOUNDS IN THESE AQUEOUS ELECTROCOAT MATERIALS

This application is a continuation of commonly owned and assigned U.S. patent application, Ser. No. 10/521,343 filed Jan. 7, 2005, now abandoned entitled: "Aqueous Electrodeposition Paints, Use Thereof, in Methods for Coating Electrically Conductive Substrates and Use of Bismuth Compounds in Said Aqueous Electrodeposition Paints", the contents of which are incorporated herein by reference thereto.

The present invention relates to aqueous electrocoat (EC) materials comprising bismuth compounds, to their use in processes for coating electrically conductive substrates, and the use of bismuth compounds in aqueous electrocoat materials.

With aqueous coating materials and the aqueous components used to prepare these coating materials, such as binder dispersions, pigment pastes, and the like, for example, there is a desire from the standpoint of the environment in particular for a very low solvent content. Besides the desired effect of a reduced burden on the environment, however, the reduction in solvent content also leads to problems. For example, the problem of bacterial and/or fungal infestation of these aqueous systems occurs to an increased extent (see Wolfgang Siegert in Farbe + Lack, Vol. 99, No. 1, 1992, pages 37 to 39). In the field of electrocoat materials as well the bacterial and/or fungal infestation of the tanks filled with the electrocoat material presents a serious problem. Problems are also posed, however, by bacterial and/or fungal infestation of the other components used in the electocoating process, such as the ultrafiltrate, the recirculated material, the anolyte, the make up material, etc. This may give rise to any of a very wide variety of problems, such as surface defects in the deposited paint film, impaired leveling, coagulation of the electrocoat material, etc.

A variety of measures have therefore been taken in order to raise the bacterial resistance of the electrocoat materials. The problem here, however, is that the desired achievement of the bactericidal or fungicidal effect must not impair the other properties of the electrocoat materials. The bacterial resistance can be increased, for example, by replacing the lactic acid commonly used to neutralize the binder by acids which are less readily biodegradable, such as acetic acid, formic acid or inorganic acids, for example. Frequently, however, this change of acid is insufficient to eliminate the problems caused by the bacterial or fungal infestation. It is also possible to add biocidal additives, such as formaldehyde or isothiazolinones, to the electrocoat materials (cf. the paper by Siegfried Kuhpal, "Mikrobielle Probleme in der Elektrotauchlackierung (ETL)" [Microbial Problems in Electrocoating], ADVANCES IN COATINGS, $2^{nd}$ Symposium, Nov. 7 to 9, 1995, "Gebindekonservierung—im Spannungsfeld Mensch-Umwelt-Technik" [In-can preservation—caught between the conflicting demands of humankind, the environment, and industry]). Furthermore, the possibility also exists of incorporating bactericidal structures into the binders that are used. Like the addition of biocidal additives, however, modifying the binders in order to achieve the bactericidal or fungicidal effect may have the consequence of impairing other properties of the electrocoat materials. Moreover, the electrocoat material may readily be infested by bacteria or fungi which are resistant to the modified binders. The consequent need to adapt the binders to these new bacteria or fungi is time-consuming and costly.

Patent EP-A 0 925 334 discloses the addition of silver or silver ions to electrocoat materials as a bactericide. In this case, however, silver may be deposited colloidally, and these deposits may in turn detract from the stability of the binders and/or electrocoat materials.

Patent EP 0 509 437 B1 describes the use of bismuth compounds or zirconium compounds alongside dialkyltin carboxylates for the purpose of improving corrosion protection. No reference to a bactericidal effect can be inferred.

Patent EP 0 642 558 B1 describes catalyzed cationic paint binders which comprise bismuth salts of lactic acid and/or of dimethylolpropionic acid. No reference to a bactericidal effect can be inferred from this patent.

European patent application EP 0 690 106 A1 discloses compositions which comprise water-soluble bismuth compounds, which are suitable as catalysts for the curing of EC materials. They include an epoxy-amine adduct in an amount such that the ratio of the number of bismuth atoms to the number of beta-hydroxyamine groups in the epoxy-amine adduct is from 1:10 to 10:1. The acid used for preparing the bismuth compounds is employed in an amount such that there are between 0.1 and less than 2 mol of dissociable protons per mole of bismuth. In the examples, only a bismuth salt of dimethylolpropionic acid is used. There are no references to a bactericidal effect.

German patent DE 43 30 002 C1 discloses the use of bismuth salts of organic carboxylic acids as catalysts for an electrocoat material whose use allows a simplified process for producing a corrosion protection coating by means of electrocoating. Apart from the bismuth compounds, no other catalysts are used. Moreover, details of any bactericidal effect of bismuth compounds are again lacking here.

German patent application DE 44 34 593 A1 describes the use of bismuth salts of organic carboxylic acids in an electrocoat material which, in combination with a nickel-free and/or chromium-free pretreatment, permits a corrosion protective coating where toxic ingredients are largely avoided. References to a bactericidal effect cannot be inferred from the patent.

It is an object of the present invention to find novel electrocoat (EC) materials which feature enhanced bacterial resistance without adverse effects on other properties such as stability and particle size of the binder dispersion or surface quality of the deposited electrocoat materials.

The invention accordingly provides the novel electrocoat (EC) materials comprising bismuth compounds, comprising (A) at least one self-crosslinking and/or externally crosslinking binder containing (potentially) cationic or anionic groups and reactive functional groups which (i) with themselves or with complementary reactive functional groups in the self-crosslinking binder, or (ii) in the case of the externally crosslinking binder, with complementary reactive functional groups present in crosslinking agents (B)

are able to undergo thermal crosslinking reactions, (B) if desired, at least one crosslinking agent comprising the complementary reactive functional groups, and (C) at least one bismuth compound, preferably selected from the group consisting of bismuth carboxylates.

In the light of the prior art and in view of the large number of known bactericides and fungicides, it was surprising and unforeseeable for the skilled worker that the object on which the invention was based could be achieved by the electrocoat materials of the invention.

A particular surprise was that the EC materials of the invention were easy to prepare, were stable on storage, featured an optimum particle size of the dispersed constituents, possessed very good filterability, and were outstandingly resistant to infestation by microorganisms. Their electrophoretic deposition on electrically conductive substrates was easy and trouble-free. The resultant electrocoats were very even, were free from surface defects and inhomogeneities, and afforded outstanding corrosion protection and edge protection. Furthermore, the deposited but uncured or only part-cured films of the EC materials of the invention could be overcoated wet on wet with aqueous coating materials, such as waterborne primers or waterborne surfacers, without defects or problems and then baked together with said aqueous coating materials.

Accordingly, the present invention further provides for the use of at least one bismuth compound, preferably selected from the group consisting of bismuth carboxylates, in electrocoat materials for increasing the resistance of said materials to infestation by microorganisms, and provides for the use of the bismuth compound, preferably selected from the group consisting of bismuth carboxylates, as a bactericide for electrocoat materials (EC materials).

In the context of such a use of bismuth carboxylates in electrocoat materials, particularly advantageous effects arise if the bismuth carboxylates are formed from carboxylic acids selected from the group consisting of aliphatic carboxylic acids which other than the carboxylic acid preferably contain no further functional groups and of aromatic carboxylic acids. In the case of such use, the bismuth carboxylates are employed preferably in an amount of from 0.05 to 4% by weight, based on the solids of the electrocoat material.

Likewise embraced by the present invention is a process for preparing electrocoat materials with increased resistance to infestation by microorganisms, which comprises adding at least one bismuth compound, preferably selected from the group consisting of bismuth carboxylates, to a conventional electrocoat material.

The EC materials of the invention preferably have a solids content of from 5 to 50% by weight, more preferably from 5 to 35% by weight. Solids here are the fraction of a EC material which makes up the electrocoat produced from it. The EC materials of the invention comprise at least one binder (A).

The binders (A) may be self-crosslinking and/or externally crosslinking.

Self-crosslinking binders (A) contain reactive functional groups which are able to undergo thermal crosslinking reactions with themselves and/or with complementary reactive functional groups in the self-crosslinking binders (A).

Externally crosslinking binders (A) contain reactive functional groups which are able to undergo thermal crosslinking reactions with complementary reactive functional groups in crosslinking agents (B).

It is preferred to use at least one externally crosslinking binder (A) in combination with at least one crosslinking agent (B).

The binder (A) contains potentially cationic and/or cationic groups. Binders (A) of this kind are used in cathodically depositable electrocoat materials.

Examples of suitable potentially cationic groups which can be converted into cations by neutralizing agents and/or quaternizing agents are primary, secondary or tertiary amino groups, secondary sulfide groups or tertiary phosphine groups, especially tertiary amino groups or secondary sulfide groups.

Examples of suitable cationic groups are primary, secondary, tertiary or quaternary ammonium groups, tertiary sulfonium groups or quaternary phosphonium groups, preferably quaternary ammonium groups or tertiary sulfonium groups, but especially quaternary ammonium groups.

Examples of suitable neutralizing agents for the potentially cationic groups are inorganic and organic acids such as sulfuric acid, hydrochloric acid, phosphoric acid, sulfonic acids, such as amidosulfonic acid or methanesulfonic acid, for example, formic acid, acetic acid, lactic acid, dimethylolpropionic acid or citric acid, especially formic acid, acetic acid or lactic acid.

Examples of suitable binders (A) for cathodically depositable electrocoat materials are known from documents EP 0 082 291 A1, EP 0 234 395 A1, EP 0 227 975 A1, EP 0 178 531 A1, EP 0 333 327, EP 0 310 971 A1, EP 0 456 270 A1, U.S. Pat. No. 3,922,253 A, EP 0 261 385 A1, EP 0 245 786 A1, EP 0 414 199 A1, EP 0 476 514 A1, EP 0 817 684 A1, EP 0 639 660 A1, EP 0 595 186 A1, DE 41 26 476 A1, WO 98/33835, DE 33 00 570 A1, DE 37 38 220 A1, DE 35 18 732 A1 or DE 196 18 379 A1. These are preferably resins (A) containing primary, secondary, tertiary or quaternary amino or ammonium groups and/or tertiary sulfonium groups and having amine numbers of preferably between 20 and 250 mg KOH/g and a weight-average molecular weight of from 300 to 10 000 daltons. In particular, use is made of amino(meth)acrylate resins, amino epoxy resins, amino epoxy resins with terminal double bonds, amino epoxy resins with primary and/or secondary hydroxyl groups, amino polyurethane resins, amino-containing polybutadiene resins or modified epoxy resin-carbon dioxide-amine reaction products.

Examples of suitable potentially anionic groups which can be converted into anions by neutralizing agents are carboxylic, sulfonic or phosphonic acid groups, especially carboxylic acid groups.

Examples of suitable anionic groups are carboxylate, sulfonate or phosphonate groups, especially carboxylate groups.

Examples of suitable neutralizing agents for the potentially nonionic groups are ammonia, ammonium salts, such as ammonium carbonate or ammonium hydrogen carbonate, for example, and also amines, such as trimethylamine, triethylamine, tributylamine, dimethyl-aniline, diethylaniline, triphenylamine, dimethyl-ethanolamine, diethylethanolamine, methyldiethanol-amine, triethanolamine, and the like.

Examples of suitable binders (A) for anodically depositable electrocoat materials are known from German patent application DE 28 24 418 A1. They are preferably polyesters, epoxy resin esters, poly(meth)acrylates, maleate oils or polybutadiene oils having a weight-average molecular weight of from 300 to 10 000 daltons and an acid number of from 35 to 300 mg KOH/g.

The amount of neutralizing agent is generally chosen such that from 1 to 100 equivalents, preferably from 30 to 90 equivalents, as the potentially cationic or potentially anionic groups of a binder (A) are neutralized.

Examples of suitable reactive functional groups are hydroxyl groups, thiol groups, and primary and secondary amino groups, especially hydroxyl groups.

Examples of suitable complementary reactive functional groups are blocked isocyanate groups, hydroxymethylene and alkoxymethylene groups, preferably methoxymethylene and butoxymethylene groups, and especially methoxymethylene groups. Preference is given to using blocked isocyanate groups. Examples of suitable blocking agents are those described below.

The EC materials used are preferably cathodic.

The amount of the above-described binders (A) in the EC materials of the invention is guided in particular by their solubility and their dispersibility in the aqueous medium and by their functionality with regard to the crosslinking reactions with themselves or with the constituents (B), and may therefore be determined readily by the skilled worker on the basis of his or her general art knowledge, where appropriate with the assistance of simple preliminary tests.

Suitable crosslinking agents (B) include all customary and known crosslinking agents which contain suitable complementary reactive functional groups. The crosslinking agents (B) are preferably selected from the group consisting of blocked polyisocyanates, melamine-formaldehyde resins, tris(alkoxycarbonyl-amino)triazines, and polyepoxides. The crosslinking agents (B) are more preferably selected from the group consisting of blocked polyisocyanates and highly reactive melamine-formaldehyde resins. With particular preference the blocked polyisocyanates are used.

The blocked polyisocyanates (B) are prepared from customary and known paint polyisocyanates containing aliphatically, cycloaliphatically, araliphatically and/or aromatically attached isocyanate groups.

Preference is given to using paint polyisocyanates having from 2 to 5 isocyanate groups per molecule and having viscosities of from 100 to 10 000, preferably from 100 to 5 000, and in particular from 100 to 2 000 mPas (at 23° C.). Moreover, the paint polyisocyanates may have been given a conventional hydrophilic or hydrophobic modification.

Examples of suitable paint polyisocyanates are described, for example, in "Methoden der organischen Chemie", Houben-Weyl, Volume 14/2, $4^{th}$ edition, Georg Thieme Verlag, Stuttgart 1963, pages 61 to 70, and by W. Siefken, Liebigs Annalen der Chemie, Volume 562, pages 75 to 136.

Further examples of suitable paint polyisocyanates are polyisocyanates containing isocyanurate, biuret, allophanate, iminooxadiazinedione, urethane, urea, carbodiimide and/or uretdione groups, which are obtainable from customary and known diisocyanates. As diisocyanates it is preferred to use hexamethylene diisocyanate, isophorone diisocyanate, 2-isocyanatopropylcyclohexyl isocyanate, dicyclohexyl-methane 2,4'-diisocyanate, dicyclohexylmethane 4,4'-diisocyanate or 1,3-bis(isocyanatomethyl)cyclohexane (BIC), diisocyanates derived from dimer fatty acids, 1,8-diisocyanato-4-isocyanatomethyloctane, 1,7-diiso-cyanato-4-isocyanatomethylheptane, 1-isocyanato-2-(3-isocyanatopropyl)cyclohexane, 2,4- and/or 2,6-tolylene diisocyanate, 4,4'-diphenylmethane diisocyanate, naphthalene diisocyanate or mixtures of these polyisocyanates.

Examples of suitable blocking agents for preparing the blocked polyisocyanates (B) are i) phenols, such as phenol, cresol, xylenol, nitrophenol, chlorophenol, ethylphenol, t-butylphenol, hydroxybenzoic acid, esters of this acid or 2,5-di-tert-butyl-4-hydroxytoluene;

ii) lactams, such as ε-caprolactam, δ-valerolactam, γ-butyrolactam or β-propiolactam;

iii) active methylenic compounds, such as diethyl malonate, dimethyl malonate, methyl or ethyl acetoacetate or acetylacetone;

iv) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, glycolic acid, glycolates, lactic acid, lactates, methylolurea, methylolmelamine, diacetone alcohol, ethylenechlorohydrin, ethylenebromohydrin, 1,3-dichloro-2-propanol, 1,4-cyclohexyldimethanol or acetocyanohydrin;

v) mercaptans such as butyl mercaptan, hexyl mercaptan, t-butyl mercaptan, t-dodecyl mercaptan, 2-mercaptobenzothiazole, thiophenol, methylthio-phenol or ethylthiophenol;

vi) acid amides such as acetoanilide, acetoanisidinamide, acrylamide, methacrylamide, acetamide, stearamide or benzamide;

vii) imides such as succinimide, phthalimide or maleimide;

viii) amines such as diphenylamine, phenylnaphthylamine, xylidine, N-phenylxylidine, carbazole, aniline, naphthylamine, butylamine, dibutylamine or butylphenylamine;

ix) imidazoles such as imidazole or 2-ethylimidazole;

x) ureas such as urea, thiourea, ethyleneurea, ethylenethiourea or 1,3-diphenylurea;

xi) carbamates such as phenyl N-phenylcarbamate or 2-oxazolidone;

xii) imines such as ethyleneimine;

xiii) oximes such as acetone oxime, formaldoxime, acetaldoxime, acetoxime, methyl ethyl ketoxime, diisobutyl ketoxime, diacetyl monoxime, benzophenone oxime or chlorohexanone oximes;

xiv) salts of sulfurous acid such as sodium bisulfite or potassium bisulfite;

xv) hydroxamic esters such as benzyl methacrylo-hydroxamate (BMH) or allyl methacrylohydroxamate; or xvi) substituted pyrazoles, imidazoles or triazoles; and also xvii) mixtures of these blocking agents.

The amount of the above-described crosslinking agents (B) in the EC materials of the invention is guided in particular by their functionality with regard to the crosslinking reaction with the constituents (A) and may therefore readily be determined by the skilled worker on the basis of his or her art knowledge, where appropriate with the assistance of simple preliminary tests.

In accordance with the invention the EC materials comprise at least one bismuth compound (C). Preferably, bismuth carboxylates are employed. The bismuth carboxylates which can be employed are preferably formed from carboxylic acids selected from the group consisting of aliphatic carboxylic acids which besides the carboxylic acid preferably contain no further functional group and of aromatic carboxylic acids.

One preferred bismuth compound is bismuth ethylhexanoate. This is sold, for example, by King Industries under the designation K-Kat 348 in the form of a solution. Another preferred bismuth compound (C) is the water insoluble bismuth subsalicylate of empirical formula $C_7H_5O_4Bi$. It has a bismuth content of from 56 to 60% by weight. Bismuth subsalicylate (C) is a commercial compound and is sold, for example, by MCP HEK GmbH, Lübeck, Germany.

Based on the solids, the EC materials of the invention contain preferably from 0.05 to 4%, more preferably from 0.1 to 3.5%, and in particular from 0.15 to 3% by weight of bismuth compound (C).

One, advantage of the EC materials of the invention is that the various possible bismuth compounds which may be employed in accordance with the invention can be incorporated either solid or else as liquids (in solution and/or dispersion) into binders or binder dispersions and/or grinding resins or grinding resin dispersions.

Additionally, the EC materials of the invention may further comprise at least one customary and known additive (D) selected from the group consisting of catalysts other than bismuth compound (C); pigments; anticrater additives; polyvinyl alcohols; thermally curable reactive diluents; molecularly dispersely soluble dyes; light stabilizers, such as UV absorbers and reversible free-radical scavengers (HALS); antioxidants; low-boiling and high-boiling ("long") organic solvents; devolatilizers; wetting agents; emulsifiers; slip additives; polymerization inhibitors; thermolabile free-radical initiators; adhesion promoters; leveling agents; film-forming auxiliaries; flame retardants; corrosion inhibitors; flow aids; waxes; siccatives; biocides, and flatting agents, in effective amounts.

Further examples of suitable additives (D) are described in the textbook "Lackadditive" [Additives for coatings] by Johan Bieleman, Wiley-VCH, Weinheim, N.Y., 1998, in D. Stoye and W. Freitag (editors), "Paints, Coatings and Solvents", Second, Completely Revised Edition, Wiley-VCH, Weinheim, N.Y., 1998, "14.9. Solvent Groups", pages 327 to 373.

Pigments are preferably used as additives (D). The pigments (D) are preferably selected from the group consisting of customary and known color pigments, effect pigments, electrically conductive pigments, magnetically shielding pigments, fluorescent pigments, extender pigments, and anticorrosion pigments, organic and inorganic.

The EC materials of the invention are prepared by mixing and homogenizing the above-described constituents using customary and known mixing techniques and apparatus such as stirred tanks, stirred mills, extruders, kneading apparatus, Ultraturrax, inline dissolvers, static mixers, micromixers, toothed-gear dispersers, pressure relief nozzles and/or microfluidizers. The pigments are incorporated preferably in the form of pigment pastes or pigment preparations into the EC materials (cf. Römpp Lexikon Lacke und Druckfarben, Georg Thieme Verlag, Stuttgart, N.Y., 1998, "Pigment preparations", page 452). The use of bismuth compounds (C) brings about an extremely high resistance of the EC materials of the invention to infestation by microorganisms. This high resistance is retained even in the case of intensive operation of the electrocoating baths of the invention, where large quantities of fresh EC material and thus further nutrient for the microorganisms are supplied.

The EC materials of the invention are applied conventionally by immersing an electrically conductive substrate in an electrocoating bath of the invention, connecting the substrate as the cathode or anode, preferably as the cathode, depositing a EC material film on the substrate using direct current, removing the coated substrate from the electrocoating bath, and subjecting the deposited EC material film to conventional thermal curing (baking). The resulting electrocoat can then be overcoated with a surfacer or with an antistonechip primer and a solid-color topcoat material or, alternatively, with a basecoat material and a clearcoat material by the wet-on-wet technique. The surfacer film or antistonechip primer film and also the solid-color topcoat film are preferably each baked individually. The basecoat film and the clearcoat film are preferably baked together. This procedure results in multicoat paint systems having outstanding performance properties.

Furthermore, it is also possible to produce multicoat paint systems by the wet-on-wet technique wherein the deposited EC material film is not cured or is only partly cured thermally and is immediately overcoated with the other coating materials, especially aqueous coating materials, after which it is baked together with at least one of the films of the coating materials (EC material film+ surfacer film; EC material film+ surfacer film+ solid-color topcoat film; EC material film+ surfacer film+ basecoat film, or EC material film+ surfacer film+ basecoat film+ clearcoat film). Here again, the resulting multicoat paint systems have outstanding performance properties, the production processes being particularly economic and energy-saving. In the course of these processes it is found that the EC material films of the invention lend themselves particularly well to undisrupted overcoating by the wet-on-wet technique.

In all cases, electrocoats of the invention are obtained which exhibit very good leveling, are free from surface defects and inhomogeneities, and afford outstanding corrosion protection and edge protection.

EXAMPLES

Example 1

1.1 Preparation of the Crosslinking Agent V1

The polyurethane crosslinker is prepared in analogy to the preparation of the polyurethane crosslinker from Example 1 in DE 196 37 559, from an isomer and relatively highly functional oligomer based on 4,4'-diphenylmethane diisocyanate, having an NCO equivalent weight of 135 g/eq (Lupranat® M 20 S from BASF) by first reacting 4.3 moles of a total of 6 moles of isocyanate with 4.3 moles of butyl diglycol and then reacting the remaining 1.7 moles of isocyanate with trimethylolpropane.

The crosslinker is present in an 80% strength solution in methyl isobutyl ketone and isobutanol (weight ratio 9:1).

1.2 Preparation of the Aqueous Binder Dispersion D1

In a reactor equipped with a stirrer, reflux condenser, internal thermometer and inert gas inlet, 682.4 parts of epoxy resin based on bisphenol A, having an epoxy equivalent weight (EEW) of 188 g/eq, are heated to 130° C. under nitrogen together with 198.4 parts of bisphenol A, 252.7 parts of ethoxylated bisphenol A having an OH number of 222 (Dianol 265 from Akzo) and 59.7 parts of methyl isobutyl ketone. Then 1.6 parts of N,N-dimethylbenzylamine are added and the mixture is heated to 150° C. and held at a temperature of between 150 and 190° C. for about 30 minutes. It is then cooled to 140° C. Thereafter 2.1 parts of N,N-dimethylbenzylamine are added and the temperature is maintained until the EEW has reached the level of 1 120 g/eq.

Then 1011.3 parts of the crosslinker V1 are added and the temperature is lowered to 100° C. Subsequently, a mixture of 65.4 parts of diketimine (obtained by reacting diethylenetriamine and methyl isobutyl ketone, 75% strength in methyl isobutyl ketone) and 59.7 parts of methylethanolamine is added and the reaction temperature is held at 115° C. for about 1 hour until a viscosity of about 6 dPas has been reached (50% dilution in methoxypropanol, cone and plate viscometer at 23° C.). 64.8 parts of 1-phenoxy-2-propanol are then added and the reaction mixture is dispersed in a mixture of 60.9 parts of lactic acid (88% strength), 15.2 parts of emulsifier mixture (mixture of 1 part of butyl glycol and 1 part of a tertiary acetylene alcohol (Surfynol 104 from Air Products)) and 3 026.6 parts of demineralized water. The volatile solvents are removed by vacuum distillation and then replaced by an equal quantity of demineralized water. Following distillation the solids content is 37% and the dispersion has a particle size of 150 nm.

Variant 1 (=D1.1): where appropriate, 5 ppm of silver ions, based on the total weight of the binder dispersion, are added to this binder dispersion D1 in the form of an aqueous 10% strength solution of silver nitrate in demineralized water.

Variant 2 (=D1.2): in accordance with the invention, 200 ppm of bismuth in the form of a commercial bismuth ethylhexanoate solution (K-Cat 348 from King Industries) are added to the dispersion during the dispersion stage.

Example 2

2.1 Preparation of the Crosslinking Agent V2

A reactor equipped with a stirrer, reflux condenser, internal thermometer and inert gas inlet is charged with 1 084 parts of isomers and relatively highly functional oligomers based on 4,4'-diphenylmethane diisocyanate, having an NCO equivalent weight of 135 (Basonat® A270 from BASF), under a nitrogen atmosphere. 0.6 part of dibutyltin dilaurate is added and 1 314 parts of butyl diglycol are added dropwise at a rate such that the product temperature remains below 70° C. Cooling may be necessary. The temperature is held at 70° C. for a further 120 minutes. In the course of the subsequent check, NCO groups can no longer be detected. The product is cooled to 70° C. Solids content is >97%.

2.2 Preparation of the Aqueous Binder Dispersion D2

In a reactor equipped with a stirrer, reflux condenser, internal thermometer and inert gas inlet, 1 128 parts of a commercial epoxy resin based on bisphenol A, having an epoxy equivalent weight (EEW) of 188, 94 parts of phenol and 228 parts of bisphenol A are introduced as an initial charge which is heated to 130° C. under a nitrogen atmosphere. 1.5 g of triphenylphosphine are added with stirring, whereupon an exothermic reaction begins and the temperature rises to 160° C. The mixture is cooled to 130° C. again and then the EEW is checked. The target value is 478. Then 156.7 parts of Plastilit 3060 (BASF AG) are added, accompanied by cooling. At 95° C., 115.5 parts of diethanolamine are added, whereupon an exothermic reaction begins. After 40 minutes 61.2 parts of N,N'-dimethylaminopropylamine are added. After a brief exotherm (140° C.), the batch is allowed to continue reacting at 130° C. for 2 hours until the viscosity remains constant.

97.6 parts of butyl glycol and 812 parts of the hot (70° C.) solution of the crosslinking agent V2 are stirred rapidly into the resulting reaction mixture, which is then discharged at 105° C. 2 400 parts of the resulting mixture are immediately dispersed in a ready-prepared mixture of 2 173 parts of demineralized water and 49.3 parts of glacial acetic acid. The addition of a further 751 parts of demineralized water results in a stable dispersion having the following characteristics:

| | |
|---|---|
| Solids (60 min/130° C.): | 45.1% |
| pH: | 5.9 |
| average particle size: | 145 nm |

2.3 Preparation of the Aqueous Binder Dispersion D2.1

The procedure described under 2.2 is repeated except that following the addition of the crosslinking agent 9 parts of bismuth ethylhexanoate solution (K-Kat 348 from King Industries) are also added. Subsequent procedure is as under 2.2. This gives a dispersion having the following characteristics:

| | |
|---|---|
| Solids (60 min/130° C.): | 44.8% |
| pH: | 5.8 |
| average particle size: | 135 nm |

2.4 Preparation of the Grinding Resin Solution R1

In accordance with EP 0 505 445 B1, Example 1.3, a grinding resin is prepared which for greater ease of handling is additionally neutralized and diluted with 2.82 parts of glacial acetic acid and 13.84 parts of DI water. The original solids content is thus reduced to 60%.

2.5 Preparation of Aqueous Pigment Pastes

2.5.1 Pigment Paste P1

The following components are added in succession to a high-speed dissolver stirrer and mixed for 30 minutes:
32.3 parts of demineralized water
24.1 parts of grinding resin solution R1
5.6 parts of aluminum silicate extender (ASP 200)
0.6 part of carbon black
33.8 parts of titanium dioxide (TI-pure R 900, DuPont)
3.8 parts of dibutyltin oxide The mixture is subsequently dispersed in a stirred laboratory mill for 1-2 hours to a Hegman fineness of 12 μm and where appropriate is adjusted with further water to the desired processing viscosity.

2.5.2 Pigment Paste P2

Following the procedure described under 2.5.1, the pigment paste 2 is prepared, with the further addition to the mixture of 1.1 parts of bismuth ethylhexanoate (Bi content 26%).

Alternatively, it is also possible to add 0.5 part of bismuth subsalicylate (Bi content 57%, HEK-Lübeck).

2.6 Preparation of the Electrocoat Materials

For testing as cathodically depositable electrocoat materials, the aqueous binder dispersions and pigment pastes described above are combined in accordance with the following table. The procedure here is to introduce the binder dispersion first and to dilute it with deionized water. Subsequently the pigment paste is introduced with stirring. The values reported are the weight fractions.

| | Electrocoat No. | | |
|---|---|---|---|
| | 1 | 2 | 3 |
| Binder dispersion D2 | 2 114 | | 2 114 |
| Binder dispersion D2.1 | | 2 129 | |
| Pigment paste P1 | 294 | 294 | |
| Pigment paste P2 | | | 294 |
| Demineralized water | 2 592 | 2 577 | 2 592 |

3. Testing for Bacterial Resistance

The binder dispersions of the invention (diluted to 15% solids) and the electrocoating baths of the invention were exposed to adapted microbes from contaminated cathodic electrocoat bath material. To this end 100 ml of each sample were inoculated with 0.1 ml of Burkholderia cepacia suspension.

Throughout the duration of the test, the samples are agitated on a circular shaker.

After 7 days in each case (i.e., 1 exposure cycle) the material is coated out and the microbe count is determined.

In the following evaluation, a number is given for the binder dispersion and electrocoat material, respectively, this number corresponding to the number of exposure cycles after which a significant microbe count was evident in the coated-out material.

3.1 Binder Dispersions

| | |
|---|---|
| D1 | 1 |
| D1.1 | 6 |
| D1.2 | >10 |
| D2 | 4 |
| D2.1 | >10 |

3.2 Electrocoat Materials

Electrocoat 1 4
Electrocoat 2 >10
Electrocoat 3 >10

What is claimed is:

1. A method of providing bacterial resistance to an electrocoat material, comprising:
    adding a bismuth carboxylate selected from the group consisting of bismuth ethylhexanoate, bismuth subsalicylate, and mixtures comprising at least one of the foregoing to the electrocoat material;
    wherein the electrocoat material comprises a crosslinking binder and, optionally, a crosslinking agent comprising complementary reactive functional groups, the crosslinking binder comprising groups convertible to cationic or anionic groups and reactive functional groups able to undergo thermal crosslinking reactions with themselves, with complementary reactive functional groups in the crosslinking binder, or with complementary reactive functional groups in the crosslinking agent.

2. The method of claim 1, wherein the bismuth carboxylate is bismuth subsalicylate.

3. The method of claim 2, wherein the bismuth subsalicylate has a bismuth content of from 56 to 60% by weight.

4. The method of claim 1, wherein the crosslinking binder comprises groups convertible to cationic groups.

5. The method of claim 1, wherein the bismuth carboxylate is added in an amount of 0.05 to 4% by weight, based on the solids of the electrocoat material.

6. The method of claim 5, wherein the bismuth carboxylate is added in an amount of 0.1 to 3.5% by weight, based on the solids of the electrocoat material.

7. The method of claim 6, wherein the bismuth carboxylate is added in an amount of 0.15 to 3% by weight, based on the solids of the electrocoat material.

8. The method of claim 1, wherein the bismuth carboxylate is bismuth ethylhexanoate.

9. A method of providing bacterial resistance to an electrocoat material, comprising:
    adding a water-insoluble bismuth carboxylate formed from an aromatic carboxylic acid, a mono functional aliphatic carboxylic acid, or a combination thereof to the electrocoat material;
    wherein the electrocoat material comprises a crosslinking binder and, optionally, a crosslinking agent comprising complementary reactive functional groups, the crosslinking binder comprising groups convertible to cationic or anionic groups and reactive functional groups able to undergo thermal crosslinking reactions with themselves, with complementary reactive functional groups in the crosslinking binder, or with complementary reactive functional groups in the crosslinking agent.

10. The method of claim 9, wherein the water-insoluble bismuth carboxylate is bismuth subsalicylate.

* * * * *